United States Patent [19]

Schaefer

[11] Patent Number: 4,893,572
[45] Date of Patent: Jan. 16, 1990

[54] GRAIN DRILL PLANTING DEPTH CONTROL

[76] Inventor: Michael J. Schaefer, P.O. Box 544, Okarche, Okla. 73762

[21] Appl. No.: 242,586

[22] Filed: Sep. 12, 1988

[51] Int. Cl.⁴ ............................................... A01C 5/06
[52] U.S. Cl. ..................................... 111/194; 111/164; 111/136
[58] Field of Search ................ 111/7, 84, 85, 87, 88, 111/73, 80

[56] References Cited

U.S. PATENT DOCUMENTS

| | | | |
|---|---|---|---|
| 203,207 | 4/1878 | Springer | 111/85 |
| 211,601 | 1/1879 | Springer | 111/85 |
| 310,584 | 1/1885 | Hamilton | 111/85 |
| 319,659 | 6/1885 | Altland | 111/85 |
| 322,841 | 7/1885 | Miskimen | 111/85 |
| 393,390 | 11/1888 | Patric | 111/85 |
| 2,577,775 | 12/1951 | Lemmon | 111/85 |
| 4,275,671 | 6/1981 | Baker | 111/87 |
| 4,331,205 | 5/1982 | Sorenson | 111/88 |
| 4,750,441 | 6/1988 | Pfenninger | 111/85 |

FOREIGN PATENT DOCUMENTS 1018584  1/1953  France ................................ 111/88

Primary Examiner—Danton D. DeMille
Attorney, Agent, or Firm—Robert K. Rhea

[57] ABSTRACT

In an agriculture grain drill which includes a pair of furrow forming disks rotatably mounted on a support connected with the grain drill in trailing fashion and on which downward pressure is exerted by the grain drill, a furrow closing disk depth control wheel trails the furrow disks and is vertically adjustable relative to the furrow disks by a pressure wheel support arm tongue secured to a furrow disk support bracket.

1 Claim, 1 Drawing Sheet

GRAIN DRILL PLANTING DEPTH CONTROL

BACKGROUND OF THE INVENTION

1. Field of the Invention

This invention relates to agricultural implements and more particularly to a pressure wheel mounting seed planting depth control for multirow seeding implements.

2. Description of the Prior Art

Numerous seed planting implements are well known in the agricultural implement field. One type of seed implement commonly called "grain drill" comprises a mobile frame having a seed containing hopper with the seed being dispersed through a plurality of tubes to a like plurality of juxtaposed furrowing devices thus planting parallel rows of grain, such as wheat, as the grain drill is moved in a forward direction. While this type of grain drill has operated generally satisfactorily for many years a common failure among such grain drills is controlling the depth at which the seed is planted. The problem occurring at least as a result of the seeder implement furrow forming plows or disks not being responsive to the particular type of soil encountered in large acreage fields, for example, the downward pressure on the furrow forming elements results in a deeper furrow than desired when soft soil is encountered while conversely when hard packed soils are encountered, the furrow is formed too shallow for inducing seed germination.

This invention for the most part solves this deficiency by mounting a furrow closing seed compacting adjustable furrow depth control pressure wheel rearwardly of and in the path of travel of the furrow forming disks.

SUMMARY OF THE INVENTION

This device retrofits most grain drills presently in use by connecting a furrow depth control or pressure wheel to the support journalling furrow opening disks. A pressure wheel support arm, journals the pressure wheel rearwardly of the furrow opening disks and is connected, at its forward end, with the furrow disks support by the support arm tongue slidably received vertically by a bracket on the disk support. Vertical adjustment of the pressure wheel support arm tongue in the bracket controls furrow opening disk earth penetration. Strut members connect the furrow disks support with the grain drill frame in a substantially conventional manner.

The principal object of this invention is to provide pressure wheel and bracket attachment members connected with the furrow opening disk support of grain drills which permits vertical adjustment of the pressure wheel relative to the surface of the earth and the grain drill fixed position of the furrow opening disks for retrofitting grain drills or installed as original equipment.

DESCRIPTION OF THE PREFERRED EMBODIMENTS

Figure 1:
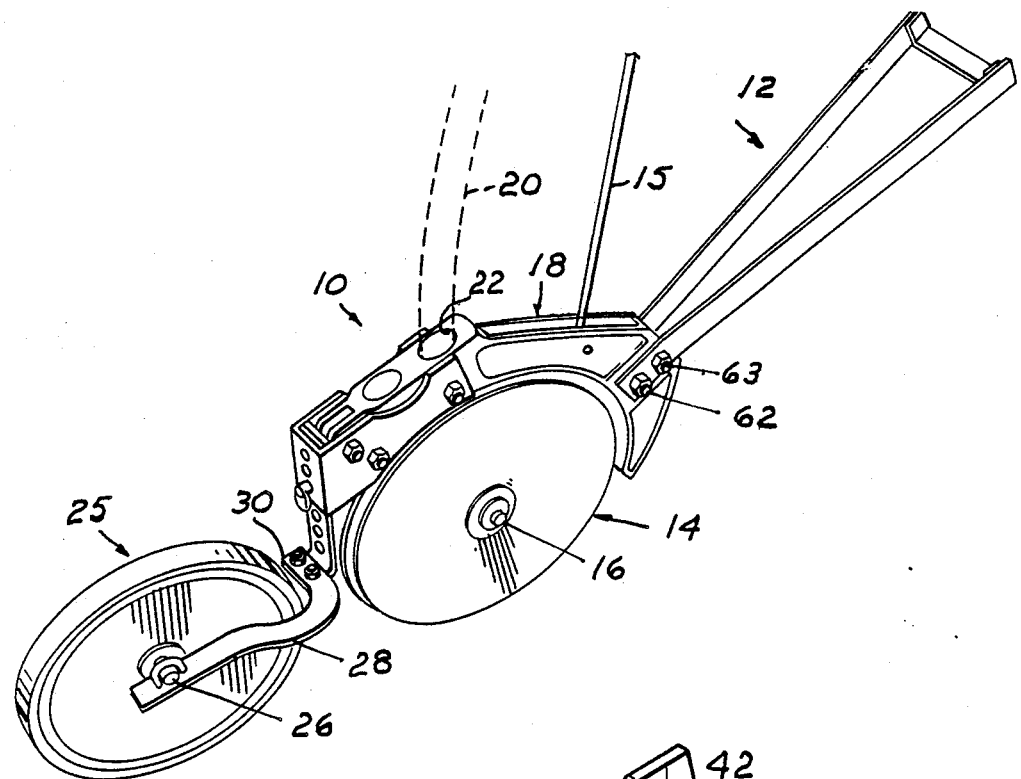
FIG. 1 is a perspective view of a pressure wheel, its support arm and the bracket connecting it with the furrow opening disk support frame.
Figure 2:
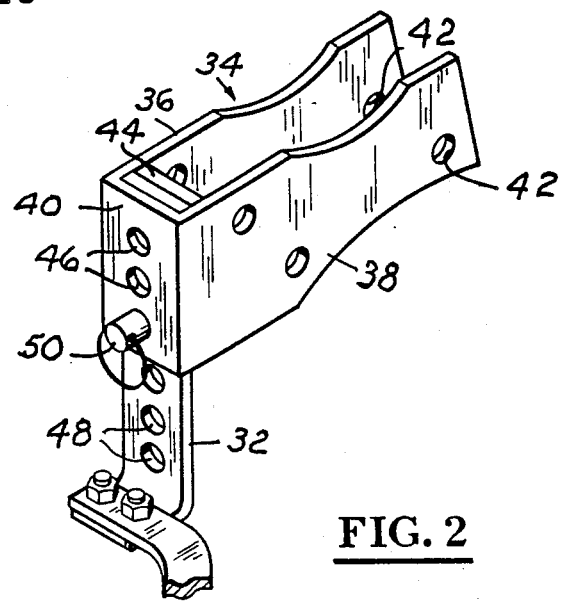
FIG. 2 is a fragmentary perspective view illustrating the vertical tongue adjustment feature for changing the horizontal plane of the pressure wheel support arm; and, FIG. 3 is an exploded perspective view of an alternative embodiment of the grain drill furrow disks support connecting struts and furrow disk angle adjustment link.
Figure 3:
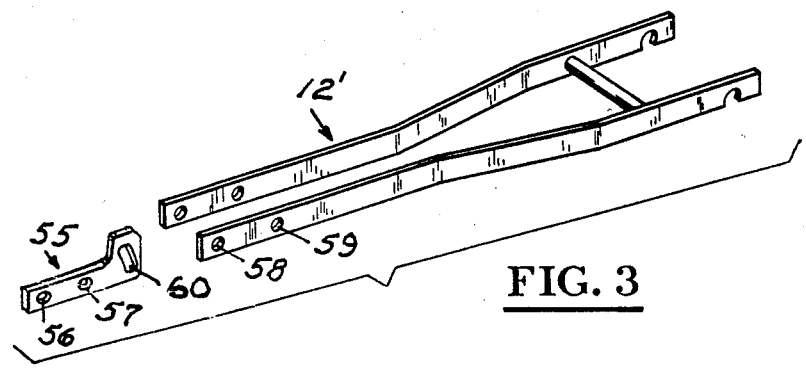

Like characters of reference designate like parts in those figures of the drawings in which they occur.

In the drawings:

The reference numeral 10 indicates one of a plurality of individual planting apparatus mounted in juxtaposition and moved in the direction of travel by draw bar struts 12 connected with the frame of a grain drill, not shown. The planting apparatus conventionally comprises a pair of furrow opening disks 14 journalled by stub axles 16, only one being shown, forming part of a disk support 18. Each disk 14 is angularly journalled with respect to each other in a manner such that the forward edges of the disks converge and touch to penetrate the surface of the earth, in response to downward pressure by a grain drill rod 15, in a furrowing generating action so that seeds falling from a grain drill hopper, not shown, through a seed tube 20 and entering an aperture 22 in the support 18, fall by gravity in the furrow created between the disks. The above description is conventional with most grain drills of the furrow opening disk type and is set forth to show the combination with which this invention is used.

The numeral 25 indicates a pressure wheel of selected diameter which may be substantially equal to the diameter of the disks 14. The pressure wheel preferably has a transversely flat periphery of a width sufficient to firmly close and/or compact the soil in a furrow closing action as the wheel follows the disks. The wheel 25 is journalled by a horizontal axle 26 mounted on one end portion of a pressure arm 28 extending generally horizontally forward and substantially defining an L-shape with the foot portion 30 of the L-shape secured to a pressure arm tongue 32.

A bracket 34 is mounted on the trailing end of the disk support 18 and comprises a U-shaped member having transversely flat parallel legs 36 and 38 longitudinally disposed on respective sides of the disk support 18 and having a bight portion 40, both legs 36 and 38 being transversely apertured, as at 42, for bolting the legs to the support 18. A partition 44 extends between and is rigidly secured to the inner surfaces of the bracket legs 36 and 38 in parallel spaced relation with respect to the bracket end bight portion 40. The spacing between the bight portion 40 and the partition 44 is such that it freely receives, in vertical sliding relation, the upstanding end portion of the support arm tongue 32. The bight portion 40 and partition 44 are horizontally line drilled, as at 46, in selected vertically spaced relation and similarly the wheel support arm tongue 32 is provided with a plurality of vertically spaced openings or apertures 48.

A manually inserted clip pin 50, passing through the bight portion 40, the tongue 32 and partition 44, secures the pressure wheel 25 in a selected position with respect to the disks 14 so that the pressure wheel bearing against the surface of the earth, not shown, maintains the disks in a selected earth penetrating elevation.

The numeral 12' indicates alternative draw bar struts replacing the struts 12 on certain grain drills for the purpose of adjusting the angular position of the planting apparatus 10 with respect to the surface of the earth. This angular adjustment is achieved by a strap link 55 having apertures 56 and 57 matching the pair of apertures 58 and 59 in the struts 12'. One end portion of the link is laterally extended and provided with an arcuate slot 60. The link 55 is interposed between the struts and the support 18 and secured by the bolts 62 and 63. The strut apertures 58 also receive the bolt 63 and the strut apertures 59 are bolted to the link through its slot 60 by other short bolts, not shown.

Obviously the invention is susceptible to changes or alterations without defeating its practicability. Therefore, I do not wish to be confined to the preferred embodiment shown in the drawings and described herein.

I claim:

1. An attachment for use with an agriculture seeding implement having a seed planting apparatus comprising a pair of furrow opening disks substantially aligned with respect to the intended direction of travel in a seed planting action of the implement and having a superposed disk support journalling the disks and connected in rearward longitudinal trailing fashion with the implement by a pair struts, comprising: a pressure wheel disposed rearwardly of and in substantial alignment with said pair of disks;

means including a pressure arm for journalling said wheel;

telescoping tongue and bracket means connecting said arm with the disk support for vertically positioning said wheel relative to said disks and limiting the earth penetrating action of said disks to a predetermined depth, said telescoping tongue and bracket means including a U-shaped bracket having generally parallel legs straddling and connected with opposing sides of said support and having a generally vertically disposed bight portion disposed rearwardly of the support, said telescoping tongue and bracket means further including a generally vertically disposed tongue secured at its depending end with the end of said pressure arm opposite the pressure wheel in vertically slidable contact and with bight portion, said bight portion and said tongue each having a series of vertically spaced bolt receiving openings, said pair of struts being bolted to the forwardly projecting portion of said support; and, a strut link interposed between and connecting said support with said pair of struts, said link having an arcuate slot permitting a selected angular attitude of said seed planting apparatus with respect to said struts and the surface of the earth.

* * * * *